US009356898B2

(12) United States Patent
Stern

(10) Patent No.: US 9,356,898 B2
(45) Date of Patent: May 31, 2016

(54) TRANSMISSION FILTERING PROCESSOR ARCHITECTURE

(71) Applicant: CUBIC CORPORATION, San Diego, CA (US)

(72) Inventor: Richard Stern, San Diego, CA (US)

(73) Assignee: Cubic Corporation, San Diego, CA (US)

(*) Notice: Subject to any disclaimer, the term of this patent is extended or adjusted under 35 U.S.C. 154(b) by 381 days.

(21) Appl. No.: 13/742,122

(22) Filed: Jan. 15, 2013

(65) Prior Publication Data
US 2014/0201273 A1 Jul. 17, 2014

(51) Int. Cl.
G06F 13/00 (2006.01)
H04L 12/58 (2006.01)
H04L 29/06 (2006.01)

(52) U.S. Cl.
CPC .......... H04L 51/12 (2013.01); H04L 63/0209 (2013.01); H04L 63/0428 (2013.01)

(58) Field of Classification Search
CPC ............ H04L 29/121216; H04L 29/12301; H04L 12/581; H04L 29/06; H04L 29/08072; H04L 29/06027; H04L 51/12; H04L 63/0209; H04L 63/0428; G06Q 10/10
USPC ........................ 709/226–229, 204; 713/165
See application file for complete search history.

(56) References Cited

U.S. PATENT DOCUMENTS 6,581,092 B1* 6/2003 Motoyama et al. .......... 709/219
7,181,540 B2* 2/2007 Whitaker et al. ............ 709/249
7,529,803 B2* 5/2009 Levi et al. .................... 709/206
7,805,532 B2* 9/2010 Pattison et al. .............. 709/230
8,220,038 B1* 7/2012 Lucchesi et al. ................ 726/9
8,312,174 B2* 11/2012 Espina Perez et al. ....... 709/250
8,572,184 B1* 10/2013 Cosoi ........................... 709/206
2002/0073313 A1* 6/2002 Brown et al. ................. 713/165
2002/0078198 A1* 6/2002 Buchbinder et al. ......... 709/224
2007/0049262 A1* 3/2007 Jung et al. .................... 455/418
2008/0162652 A1* 7/2008 True et al. .................... 709/206
2009/0216890 A1* 8/2009 Dussaume et al. ........... 709/229
2009/0254985 A1* 10/2009 Weller et al. ................... 726/11
2010/0036918 A1* 2/2010 Gupta .......................... 709/206
2010/0057860 A1* 3/2010 Fry et al. ...................... 709/206
2012/0149353 A1* 6/2012 Helfrich ....................... 455/418
2013/0282564 A1* 10/2013 Sibbald ........................ 705/39

OTHER PUBLICATIONS

International Search Report and Written Opinion of PCT/US2014/011216, mailed on May 2, 2014, 12 pages.

* cited by examiner

Primary Examiner — Robert B Harrell
(74) Attorney, Agent, or Firm — Kilpatrick Townsend & Stockton LLP

(57) ABSTRACT

A processor for filtering message traffic between communication systems may include an input buffer and an output buffer. The processor may also include a memory interface communicatively coupled to a filter rule table that includes message filter rules for verifying input messages received by the input buffer and build output message rules for constructing output messages based on the input messages received by the input buffer. The processor may additionally include a message filter state-machine circuit communicatively coupled to the input buffer that applies the message filter rules to the input message from the input buffer and determines whether the input message conforms to each of the message filter rules. The processor may further include a build output message state-machine circuit that constructs an output message based on the input message and causes the output message to be stored in the output buffer.

20 Claims, 11 Drawing Sheets

| Bits/Word | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | Src | | Reserved | | | | Size | | | | | Type of Verification | | | | |
| 1 | Type | Last | | | | Reserved | | | | | | | | List Values | | |
| 2 | Location Start | | | | | | | | | | | | | | | |
| 3 | | | | | | | | | | | | Location End | | | | |
| 4 | Mask | | | | | | | | | | | | | | | |
| 5 | Compare Value 0 | | | | | | | | | | | | | | | |
| 6 | ... | | | | | | | | | | | | | | | |
| 6 | Compare Value N-1 | | | | | | | | | | | | | | | |
| 7 | Pointer to Next Address | | | | | | | | | | | | | | | |

| Build Output Code | Size | Source | Destination | New Value | Next Instruction |

| Bits/Word | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | Reserved | | | | | | Size | | | | | | Type of Build | | | |
| 1 | Source Word | | | | | | | | Bit Position High | | | | Bit Position Low | | | |
| 2 | Destination Word | | | | | | | | Bit Position High | | | | Bit Position Low | | | |
| 3 | Add New Field Value | | | | | | | | | | | | | | | |
| 4 | Pointer to Next Address | | | | | | | | | | | | | | | |

FIG. 6

TRANSMISSION FILTERING PROCESSOR ARCHITECTURE

BACKGROUND

In the modern world of military, industrial, and commercial communications, many different systems may be required to interface with each other. Each system may have different communication requirements, security requirements, communication protocols, languages, and/or hardware requirements. To complicate matters further, systems belonging to one organization or subject to one set of security requirements may need to routinely communicate with systems belonging to another organization that is subject to its own security requirements. Therefore, each system may need to be designed to operate with numerous protocols and security requirements.

Problems arise when systems in a multi-system communication pathway undergo individual upgrades or requirement changes. As protocols and requirements change over time, existing systems need to be upgraded or retrofitted with supplemental modules in order to communicate with the new systems. This can lead to a patchwork array of fixes, security patches, and upgrades that can affect system stability over time.

In government systems, security requirements may be very difficult to change in response to hardware technology advances. Security requirements involving classification levels and encryption types may be subject to National Security Agency (NSA) approval and a rigorous review process. Hardware implementing these security requirements may then be expected to operate for decades without change. New systems then may have to communicate with legacy security hardware despite technology advances. Therefore, improvements in the art are needed.

BRIEF SUMMARY

In one embodiment, a processor for filtering message traffic between a first communication system and a second communication system may be presented. The processor may include an input buffer storing an input message received from the first communication system and an output buffer that is accessible by the second communication system. The processor may also include a memory interface communicatively coupled to a filter rule table. The filter rule table may include message filter rules for verifying input messages received by the input buffer and build output message rules for constructing output messages based on the input messages received by the input buffer. The processor may additionally include a message filter state-machine circuit communicatively coupled to the input buffer. The message filter circuit may apply the message filter rules to the input message from the input buffer, and determine whether the input message conforms to each of the message filter rules. The processor may further include a build output message state-machine circuit communicatively coupled to the input buffer and the output buffer. The build output message circuit may construct an output message based on the input message, and cause the output message to be stored in the output buffer.

In another embodiment, a method of filtering message traffic between a first communication system and a second communication system using a trusted guard processor may be presented. The method may include receiving an input message from an input buffer, where the input message is sent from the first communication system. The method may also include receiving, using a memory interface communicatively coupled to a filter rule table, message filter rules for verifying input messages received by the input buffer and build output message rules for constructing output messages based on the input messages received by the input buffer. The method may additionally include applying the message filter rules to the input message from the input buffer using a message filter state machine circuit that is communicatively coupled to the input buffer. The method may further include determining whether the input message conforms to each of the message filter rules using the message filter state machine circuit. The method may also include constructing an output message based on the input message using a build output message state machine circuit that is communicatively coupled to the input buffer and an output buffer. The method may additionally include causing the output message to be stored in the output buffer, where the output buffer may be accessible by the second communication system.

In some embodiments, the message filter state machine circuit and the build output message state machine circuit may be separate state machine circuits, neither of which is implemented using a general-purpose processor. The message filter state machine circuit and the build output message state machine circuit may be configured to process input messages at a rate of at least 100 Mb/s. The build output message state machine circuit may be able to construct the output message after the message filter state machine circuit determines that the input message conforms to each of the message filter rules. The message filter rules may be executed in a first batch, and the build output message rules are executed in a second batch.

In some embodiments, one or more of the message filter rules may include an AND condition that instructs the message filter state machine circuit to determine that the input message does not conform to each of the message filter rules if any of the one or more message filter rules fails. In some embodiments, one or more of the message filter rules may include an OR condition that instructs the message filter state machine circuit to determine that the input message does not conform to each of the message filter rules if each of the one or more message filter rules fails.

Some embodiments may also include an encryption circuit that operates based on one or more of the build output message rules to encrypt at least a portion of the output message. The encryption circuit may be certified by the National Security Agency (NSA). In some embodiments, the first communication system and the second communication system may be subject to different security requirements.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 4 illustrates a bit level rule format for some message filter rules, according to one embodiment.

FIG. 5 illustrates an build output message rule format, according to one embodiment.

FIG. 6 illustrates a bit level rule format for some build output message rules, according to one embodiment.

DETAILED DESCRIPTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Figure 1A:
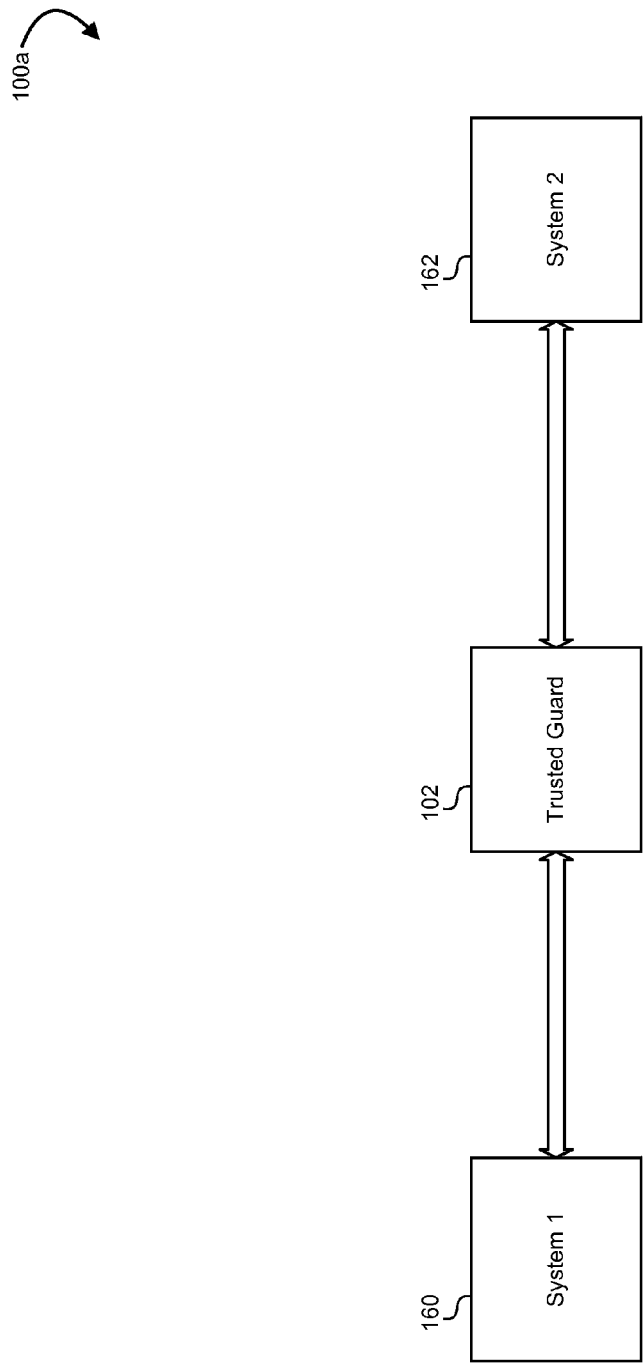
FIG. 1A illustrates a block diagram of a multi-system communication scheme, according to one embodiment.

Described herein, are embodiments for filtering messages between communication systems. FIG. 1A illustrates a block diagram 100a of a multi-system communication scheme, according to one embodiment. A first communication system 160 may have a first set of security requirements and may utilize a first communication protocol, while a second communication system 162 may have a second set of security requirements and may utilize a second communication protocol. In order to ensure the compatibility of the first communication system 160 with the second communication system 162, an intermediate system may be required to translate message formats, data components, and protocols.

In some cases, the first communication system 160 may require that messages be filtered to add, remove, and/or modify data contents before they are passed on to the second communication system 162. For example, in military systems information may pass from a classified host operating at an unclassified level to communicate with other hosts in an unclassified computing environment. In this case, a specialized gateway may be required as an interconnect between secured and unsecured computing environments. Messages leaving the classified environment may need to be deconstructed, filtered for content, encrypted, and rebuilt in a manner that is acceptable for an unclassified network.

In some cases, the first communication system 160 and the second communication system 162 may be legacy systems that are expected to be in service for decades. This may often be the case in military systems. Aircraft systems, weapons systems, navigational systems, communication systems, and/or command-and-control systems may often be in service more than 20 years in the field. Upgrading a single weapon system may require compatibility with many existing systems that might not be subject to the same type of upgrade. Upgrading each system may depend on military need and government funding, and thus it may be very difficult to predict when a system will be upgraded.

In some cases, upgrading individual systems may be very difficult. Often times, hardware/software operating in extreme environments may need to undergo a rigorous qualification process. Communication protocols, and/or encryption techniques may require years of testing and qualification by government agencies in order to be used in the field. For example, encryption algorithms and hardware may require years of certification by the National Security Agency (NSA). Therefore, approved encryption hardware may be in use for many years, and any interfacing system may be required to use the existing encryption hardware interface.

In some cases, the first communication system 160 and the second communication system 162 may be required to communicate in real time. Communication buses may reach speeds up to 100 Mb/s. In these cases, general-purpose microprocessors and/or microcontrollers running software are often too slow and require too much overhead to maintain required communication speeds. Therefore, dedicated hardware offers a faster option over programming existing microprocessors. Additionally, commercially available microprocessors are difficult to certify for harsh environments, sensitive data, and military use. There may exist a prevailing feeling that software running on a general purpose processor cannot be reliable enough for critical applications.

The embodiments herein may describe an intermediate system referred to as a trusted guard 102. Some embodiments may be designed to translate between various message formats and protocols that might be used by the first communication system 160 and/or the second communication system 162. In some embodiments, the trusted guard 102 may comprise a special-purpose hardware processor designed to use a custom set of instructions specifically designed to filter messages and translate them to a new format. These embodiments may offer the reliability and predictability desired by critical applications. These embodiments may also be custom-made and government fabrication shops or readily programmed into field programmable gate arrays (FPGAs). By using dedicated hardware, messages may be processed at a much higher rate than using a general-purpose microprocessor running software. Custom rules give the trusted guard 102 flexibility needed to accommodate different communication systems and different operating environments.

Figure 1B:
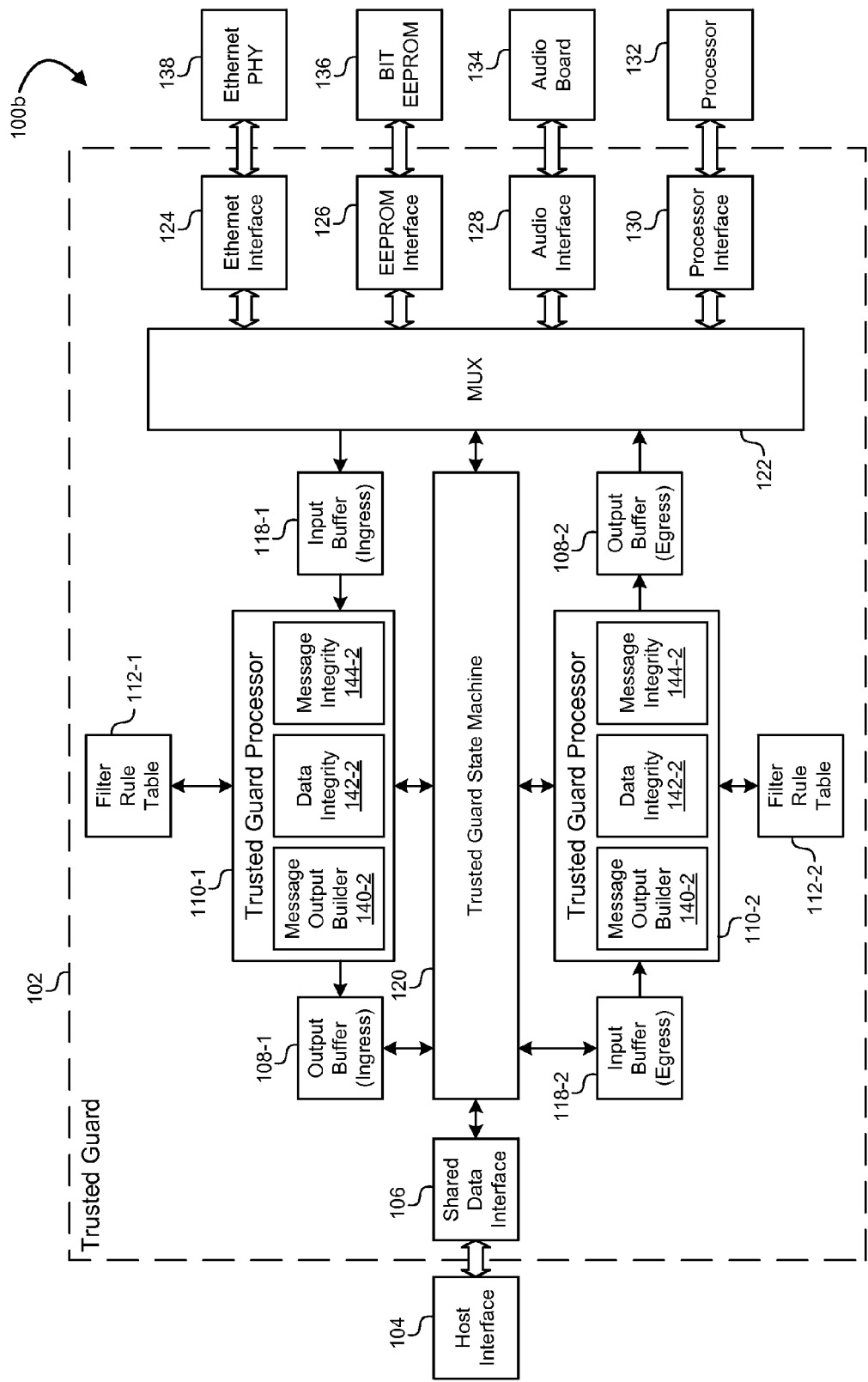
FIG. 1B illustrates a block diagram of a trusted guard, according to one embodiment.

FIG. 1B illustrates a block diagram 100b of a trusted guard 102, according to one embodiment. The trusted guard 102 may be implemented on a host communication system. In other embodiments, the trusted guard 102 may be a standalone computer system physically separate from any of the other communication systems with which it is communicatively coupled. When implemented on a host computer system, a shared data interface 106 may communicate with a host interface 104 to send and receive messages.

Trusted guard 102 may also include a general communication interface that is able to communicate with a number of different systems using multiple protocols. Merely by way of example, the trusted guard 102 of block diagram 100b includes an ethernet interface 124 that communicates with an ethernet PHY 138. Also included is an EEPROM interface 126 that communicates with a BIT EEPROM 136. Also included is an audio interface 128 that communicates with an audio board 134. Also included is a processor interface 130 that communicates with a processor 132. The ethernet PHY 138, the BIT EEPROM 136, the audio board 134, and/or the processor 132 may be located on separate communication systems. The separate communication systems may communicate with each other through the trusted guard 102 or with the host system. A multiplexor 122 may be used to switch between the various interfaces 124, 126, 128, 130 as needed by the particular operating environment.

Information received from the shared data interface 106 and/or the various interfaces 124, 126, 128, 130 can be provided to the trusted guard state machine 120. The trusted guard state machine 120 can generate outputs that control the trusted guard processors 110, the output buffers 108, and/or the input buffers 118. Specifically, the trusted guard state machine 120 may generate control outputs that instruct the output buffers 108 and/or the input buffers 118 to shift new values in and out of there internal storage memories. Also, the trusted guard state machine 120 may generate control outputs that instruct the trusted guard processors 110 to filter messages in the input buffers 118 and/or provide information to be stored in the output buffers 108.

In some embodiments, the trusted guard 102 may accommodate bidirectional message processing. In other words, messages may be transmitted from the host interface 104 to the various interfaces 124, 126, 128, 130. Messages may also be transmitted from the various interfaces 124, 126, 128, 130 to the host interface 104. Some embodiments may accommodate the system by using an ingress trusted guard processor 110-1 as well as an egress trusted guard processor 110-2. The ingress trusted guard processor 110-1 may have its own output buffer 108-1 and input buffer 118-1. Similarly, the egress trusted guard processor 110-2 may have its own input buffer 118-2 and output buffer 108-2. These embodiments may allow simultaneous processing of bidirectional message transmissions.

As stated earlier, systems using the trusted guard 102 may include military-qualified hardware that is expected to be used in the field for decades. Therefore, as the interfacing systems 104, 138, 136, 134, 132 evolve through upgrades and replacements, the trusted guard 102 may need to gracefully adapt to these changes without requiring hardware upgrades. At the same time, reprogrammable general-purpose processors might not be feasible due to speed, reliability, and cost constraints.

In order to accommodate these and other needs of the trusted guard 102, the trusted guard processors 110 may comprise custom hardware processors with a limited rule set that includes message filtering rules and build output message rules. These rules are quite different than an instruction set provided to a general purpose processor. These rules are much more complex and have a much larger size than processor instructions. These rules are also able to accomplish complex operations, such as encryption, message building, message filtering, and/or cyclic redundancy checks (CRCs) in a single rule. These rule types will be discussed in greater detail later in this disclosure.

The rules for the trusted guard processors 110 may be stored in filter rule tables 112. In trusted guards that accommodate both ingress and egress messages, a filter rule table 112-1 may be used by the ingress trusted guard processor 110-1, and a filter rule table 112-2 may be used for the egress trusted guard processor 110-2. The filter rule tables 112 may be implemented using any type of volatile or nonvolatile memory that will maintain the rules during the usable lifetime of the trusted guard 102.

In order to change the operation of the trusted guard 102, a new rule set may be loaded into the filter rule tables 112. In some embodiments, each filter rule table 112 may be loaded separately, while in other embodiments each filter rule table 112 may be loaded simultaneously. In many cases, filter rule table 112-1 may include different rules than filter rule table 112-2. For example, filter rule table 112-1 may include instructions for filtering and encrypting messages being sent from a classified host interface 104. Filter rule table 112-2 may include instructions for filtering and decrypting messages being sent from an unclassified processor 132. Each filter rule table 112 may be loaded with rules specific to each operating environment.

Each trusted guard processor 110 may implement at least two types of operations, each using their own rule format. The first operation type may include verifying the integrity of incoming transmissions. The first operation type may be represented by a data integrity function 142 and a message integrity function 144. Data integrity functions 142 may examine the content of a message and filter according to the content values. Message integrity functions may examine the format of the message and filter according to different protocol formats. These first operation types may be described using message filter rules. The second operation type may include a message output builder function 140. The message output builder function 140 may be used to generate an output message to be passed to a receiving system, and may use some, all, or none of the information in the input buffers 118 as a basis for the output message. These second operations may be described using build output message rules. These two operations and rule types will be discussed in greater detail below in this disclosure.

Figure 2A:
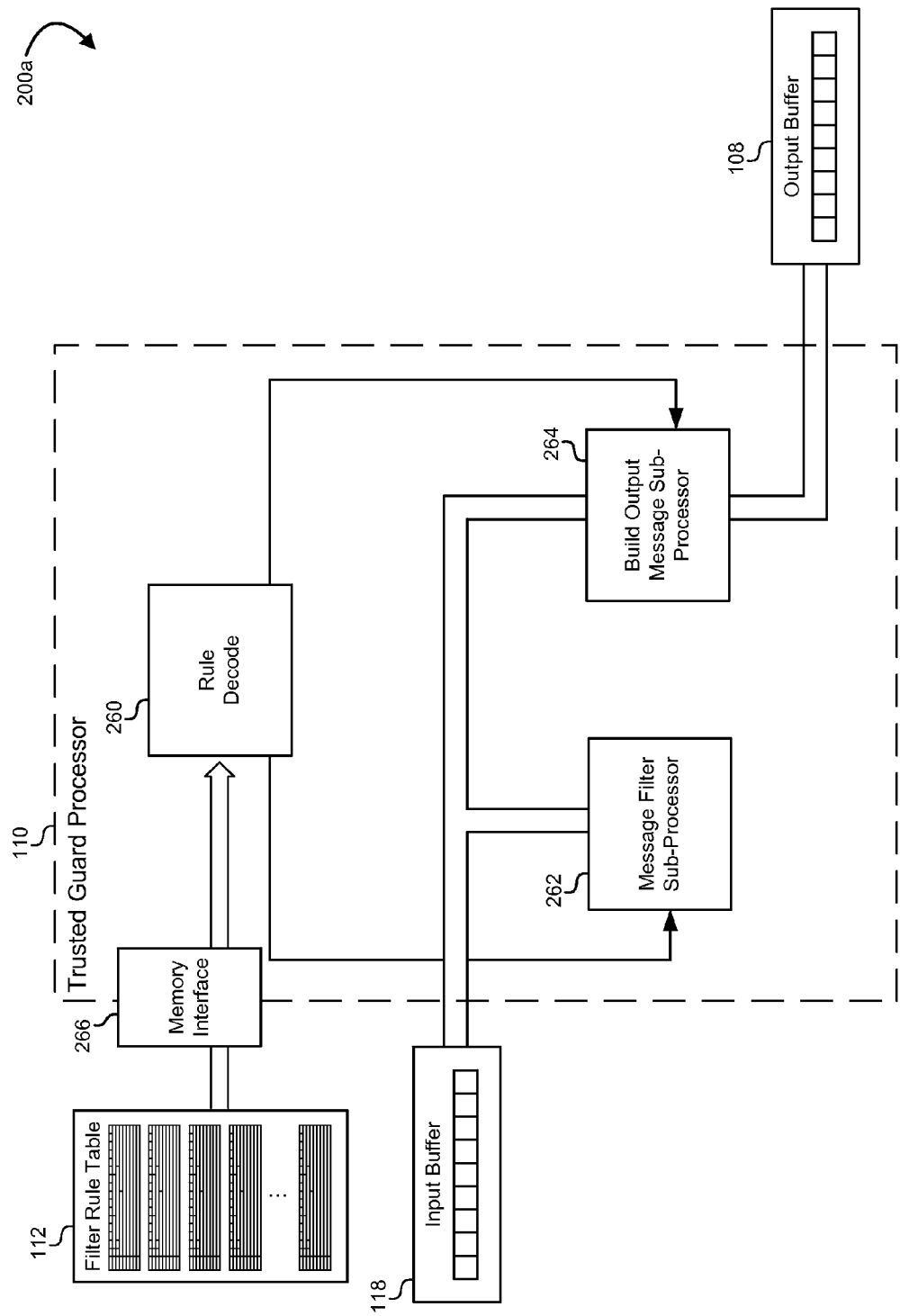
FIG. 2A illustrates a block diagram of a trusted guard processor, according to one embodiment.

FIG. 2A illustrates a block diagram 200a of a trusted guard processor 110, according to one embodiment. In some embodiments, the trusted guard processor 110 may be implemented using special-purpose hardware rather than a general purpose processor executing a set of instructions. In some embodiments, the trusted guard processor 110 may be implemented using a Field Programmable Gate Array (FPGA). The functions described herein may be written in a hardware description language, such as VHDL, and synthesized to create an FPGA image that acts as the trusted guard processor. In other embodiments, the same design may be synthesized and implemented as an ASIC processor.

In some embodiments, the filter rule table 112, the input buffer 118, and/or the output buffer 108 may be implemented using separate hardware from the trusted guard processor 110. In other embodiments, the filter rule table 112 may be implemented using an available memory structure in the same FPGA/ASIC as the trusted guard processor 110. Similarly, the input buffer 118 and/or the output buffer 108 may also be implemented using the same FPGA/ASIC as the trusted guard processor 110. A memory interface 266 may be included in the trusted guard processor 110 in order to access internal and/or external memory locations, including memory locations in the filter rule table 112, the input buffer 118, and/or the output buffer 108.

The trusted guard processor 110 may include a rule decode module 260 that determines the type of rule imported from the filter rule table 112. One or more bit fields in each rule may be used to designate whether the rule is a message filter rule or a build output message rule. Following this determination, the rule decode module 260 may send the contents of the imported rule to either a message filter sub-processor 262 or a build output message sub-processor 264 to further parse and carry out the operations represented by the imported rule.

The message filter sub-processor 262 may be implemented using a state machine that scans the various fields of the imported rule and executes operations accordingly. The build output message sub-processor 262 may also be implemented using a state machine. In some embodiments, each sub-processor may be implemented using a different state machine. These may be implemented in hardware as separate sub-processors for processing different rule types.

In some embodiments, the message filter sub-processor 262 need only access the input buffer 118, and need not access the output buffer 108. In contrast, some embodiments may allow the build output message sub-processor 264 to read fields from the input buffer 118 and write outputs to the output buffer 108. This may allow the message filter sub-processor 262 to verify any and all of the contents of the input buffer 118 before any portion of the input buffer 118 is written to the output buffer 108. Implementing the message filter sub-processor 262 and the build output message sub-processor 264 as separate subsystems may allow a red/black line to be drawn separating unclassified operations from classified operations.

In some embodiments, the filter rule table 112 may first execute a batch of message filter rules using the message filter sub-processor 262. Once the contents of the input buffer 118 have been verified according to the batch of message filter rules, a batch of build output message rules may then be executed by the build output message sub-processor 264. In some embodiments, the build output message sub-processor 264 may be prevented from operating until the batch of message filter rules have successfully verified the contents and/or format of the input buffer 118. In embodiments where the message filter sub-processor 262 and the build output message sub-processor 264 are implemented in the same subsystem, portions of the build output message sub-processor 264 may be prevented from writing to the output buffer 108 until the contents and/or format of the input buffer 118 are verified by the batch of message filter rules.

In other embodiments, message filter rules and build output message rules may be interleaved or otherwise combined in the filter rule table 112. For example, one or more message filter rules could operate on the input buffer 118, then one or more build output message rules could write data to the output buffer 108, then one or more message filter rules could operate on the same input buffer 118, and so forth. In these embodiments, portions of the input buffer 118 may be verified, processed, and written to the output buffer one at a time. If a subsequent message filter rule fails after data is written to the output buffer 108, the data in the output buffer 108 may be flushed and not sent to the receiving communications system.

Figure 2B:
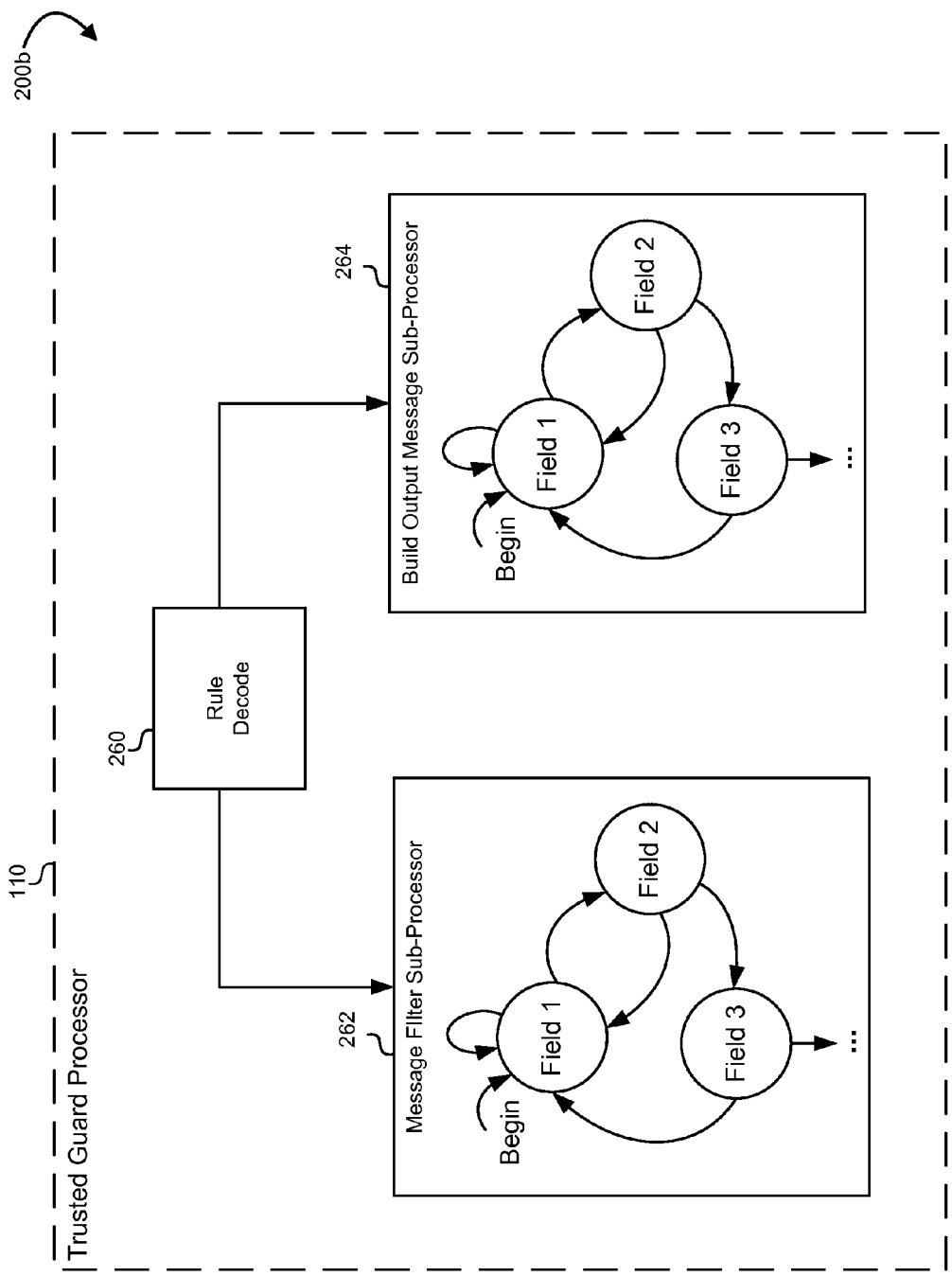
FIG. 2B illustrates a block diagram of a state machine implementation for the sub-processors, according to one embodiment.

FIG. 2B illustrates a block diagram 200b of a state machine implementation for the sub-processors, according to one embodiment. In this embodiment, the message filter sub-processor 262 and/or the build output message sub-processor 264 may be implemented using hardware state machines. These may also be referred to as state machine circuits, emphasizing that the sub-processors are not implemented with general purpose processors running software instructions.

In this embodiment, one state machine may be used for the rule decode module 260, which may provide outputs to the other sub-processors. The message filter sub-processor 262 may advance through states in the state machine, each of which examines a particular field or bit in the imported rule. Similarly, the build output message sub-processor 264 may advance through states of the state machine, each of which examines a particular field or bit in the imported rule. The outputs from the state machine states can be used to control write enable inputs to the output buffer and/or intermediate buffers.

The functions described below for each of the bit fields in the imported rule may be represented using a hardware description language, such as VHDL, and synthesized into actual hardware. These two state machines may be burned into an FPGA, or implemented at the transistor level using a custom ASIC fabrication process. Using an FPGA or a custom ASIC may allow the trusted guard processor to operate at bit rates that a general-purpose processor could not accommodate. In some embodiments, the trusted guard processor may operate at least 10 Mb/s. In other embodiments, the trusted guard processor may need to operate at speeds of at least 1 Gb/s, 10 Gb/s, and/or 40 Gb/s.

Figure 3:
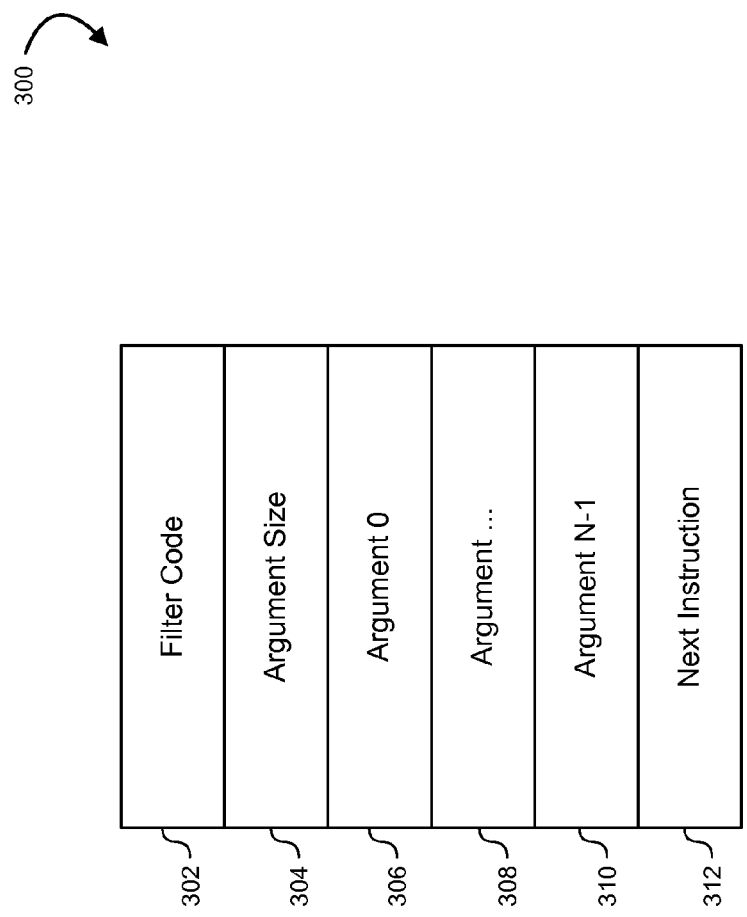
FIG. 3 illustrates a message filter rule format, according to one embodiment.

Turning now to the rule types that can be stored in the filter rule table 112, FIG. 3 illustrates a message filter rule format 300, according to one embodiment. Rule format 300 is merely exemplary, and is but one example of many possible message filter rule formats, depending upon the needs of the particular embodiment as would be understood by one having skill in the art. For example, certain fields within the rule format 300 may be added and/or omitted; field sizes may be altered; field ordering may be rearranged; and other similar changes may be made.

Generally, a message filter rule format may include some type of code identifying the rule as a message filter rule. For example, a filter code 302 may include one or more bits identifying the rule as a message filter rule. The filter code 302 may be part of a larger identification code that, in addition to identifying the rule type, also identifies operations to be performed by the particular subsystem processing the rule. For example, the filter code 302 may identify the rule as a message filter rule, as well as operations that should be performed by the message filter sub-processor 262 of FIG. 2.

A message filter rule format may also include one or more arguments. In contrast to instructions for a general-purpose processor, a message filter rule may include a variable number of values that may be used to verify the contents of a message in the input buffer. For example, a filter rule may involve operations using N values. These may be represented as N data fields within the rule, namely Argument 0 (306), Arguments 1 through Arguments N−2 (308), and Argument N−1 (310). As a variable number of arguments may be used, and argument size field 304 may be used to instruct the message filter sub-processor as to how many data fields should be read.

In some embodiments, a next instruction field 312 may be used to instruct the message filter sub-processor as to the location of the next rule to be executed if the current rule is verified successfully. In some embodiments, if the content and/or format of the input buffer fails to meet the requirements of the current message filter rule, then the message filter sub-processor may generate an error message and stop processing the input buffer. If the contents and/or format of the input buffer is successfully verified by the current message filter rule, then the rule decode module may fetch the next rule indicated by the next instruction field 312.

As stated above, many different implementations of a message filter rule format may be used according to the needs of each particular embodiment. FIG. 4 illustrates a bit level description of a particular message filter rule format 400, according to one embodiment. This particular embodiment as been implemented in a special-purpose trusted guard processor, and is described here as but one of many possible implementations.

The "Src" value can represent the source of verification. The value of 0x0 may be a default value, and may instruct the message filter sub-processor to use the input buffer as the source of the verification operation. In some embodiments, a second value of 0x1 may also be allowed, which can instruct the message filter sub-processor to use the output buffer as the source of the verification operation. Using the output buffer as a source may allow bidirectional message trafficking through a single trusted guard processor, or may allow the trusted guard processor to verify the correctness of the build output message sub-processor operations.

The "Size" field may be used to indicate the size of a verification block in the input buffer. For example, the Size field may indicate that a block of 32 bytes in the input buffer should be verified by this particular message filter rule. In this particular embodiment, the Size field uses only five bits, and therefore limits the size of the verification block to 32 units. Other embodiments may use some of the reserved bits of the first word in the message filter rule to allow for a larger Size field and consequently larger verification blocks.

The "Type of Verification" field may comprise a code that instructs the message filter sub-processor as to the type of verification that should take place. Some embodiments may instruct the message filter sub-processor to compare the input buffer to a list of values (0x2). Some embodiments may instruct the message filter sub-processor to compare an inclusive range of bits to one or more compare values (0x3). Some embodiments may perform a checksum on at least a portion of the input buffer (0x4). Some embodiments may perform miscellaneous comparison operations (0x1). Many other types of message filtering may also be indicated by the Type of Verification field, such as a CRC, masks, arithmetic operations, logical operations, and/or the like. Note that the hexadecimal codes provided in the parentheses are merely exemplary and were implemented in but one embodiment. Many other types of codes may be used.

The "Type" field may represent a combination type to be used with the previous filter. In some embodiments, a 0x0 value may indicate an "AND" relationship, while a 0x1 value may indicate an "OR" relationship. For the "AND" relationship, the union of the results of each message filter rule may be used to produce a final verification result. Therefore, if a single message filter rule fails, then the message filter sub-processor may end its processing operations and produce an error output. In other words, the input buffer may be verified against a number of different message filter rules, all of which it may need to pass. For the "OR" relationship, the intersection of the results of each filter rule could be used to produce a file verification result. Therefore, if one or more message filter rules do not fail, then the message filter sub-processor may indicate that the verification operation was successful, and may possibly allow the build output message sub-processor to create an output based on the input buffer. In other words, the input buffer may be verified against a number of different message filter rules, only one of which it may need to pass.

The "Last" field may be used to indicate whether this filter rule is the last filter rule in a batch of filter rules for particular verification session using the input buffer. This may be used such that the message filter sub-processor may exit its operational state gracefully and possibly produce an output indicating that its operations are completed.

The "List Values" field may represent a number of list of values to compare against in the message filter rule. This field may allow for filter message rules of variable length by including a variable number of compare values. Like the Size field, the List Values field may use additional reserved bits in order to increase the maximum number of compare values allowed in a single message filter rule. Alternatively, large lists of compare values can be split between multiple message filter rules.

The "Location Start" field and the "Location End" field may be used to indicate a starting and ending location in the input buffer for which the message filter rule should be verified. In some embodiments, these fields may represent 16-bit words. The "Mask" field may be used to store a mask for intra-word comparisons. For example, the mask can be combined with a word using a logical AND function for comparison.

The "Compare Values [0, N−1]" may include a variable number of comparison values to be verified against the input message block defined by the Location Start and the Location End fields. The Compare Values can be used by any type of verification function defined by the Type of Verification field. The "Pointer to Next Address" may be used to designate the address of the next rule to be imported if the current message filter rule is successful.

Message filter rules using the message filter rule format illustrated by FIG. 4 may be used to perform a number of different types of filtering operations. For example, the Combine Type field along with the ability to jump to another address may allow for many possibilities for verification routines. This essentially supports logical operators used to combine the results of multiple message filter rules. An AND operation can be used to ensure that a particular message filter rule is successful in order for the overall verification to succeed. An OR operation may be used to allow the message filter sub-processor to continue searching a list of chronological message filter rules until a successful verification or in the condition is encountered. For example, the OR operations can be used to search through a list for a specific message content, type, and/or format. The AND operation can then be used to verify the specific fields within the specific message, e.g. checksum, fixed fields, etc.

In order to illustrate the operation of the message filter sub-processor, a number of example operations will now be described. A first example may include performing a single word (16-bit) comparison. A message filter rule may set the List Values field to be 0x1 for a comparison operation. The Location Start and Location End fields can be set to the target word in the input buffer for comparison. The bits in the Mask field to be used in the comparison can be set to "1", while the rest of the bits can be set to "0". In other words, the mask can be combined with the target word using an AND operation in the message and compared with the Compare Value[0] field. The Compare Value[0] field could be set to the comparison value for the bits within the target word, and "0" otherwise. Finally, the Pointer to Next Address can be set to the next address that should be jumped to if the comparison is successful.

In order to perform N comparisons using a list of fields, the List Values field can be set to N. The Location Start, Location End, and Mask fields can be set as described above. The Compare Value[0, N−1] fields can be set to the list of values in the comparison, and the Pointer to Next Address can again be set to the next address that should be jumped to if the comparison is successful.

In order to perform a single word inclusive range check, the List Values can be set to "1". The Location Start, Location End, and Mask fields can be set as described above. The Compare Value[0] field can be set for the low end of the range, and the Compare Value[1] field can be set for the high end of the range, while setting the rest of the bits to "0".

In yet another example, a checksum can be performed by setting the List Values to "0", the Location Start and Location End fields to the beginning and end of the words to be used in the checksum computation. The checksum can be computed and compared against the checksum value in the input buffer at the position indicated by Location End+1. Other operations similar to the checksum operation may be performed by setting the Type of Verification field to the corresponding code of the desired operation.

Turning now to the second type of operations that may be performed by the trusted guard processor, FIG. 5 illustrates a build output message rule format 500, according to one embodiment. As was the case with rule format 300, rule format 500 is merely exemplary, and is but one example of many possible build output message rule formats, depending on the needs of the particular embodiment. Certain fields within rule format 500 may be added and/or omitted; field sizes may be altered; field ordering may be arranged; and other similar changes may be made.

Generally, a build output message rule format may include some type of code identifying the rule as a build output message rule. For example, a build output code 502 may include one or more bits identifying the rule as a build output message rule. The build output code 502 may be part of a larger identification code that, in addition to identifying the rule type, may also identify operations to be performed by the build output message sub-processor.

A build output message rule may generally be used to construct an output message to be forwarded to a destination communication system. In some embodiments, a message passing through the trusted guard processor may first be filtered by the message filter sub-processor, then an output may be constructed and forwarded to the destination. In simple cases, the input buffer may simply be copied to the output buffer. In more complex cases, fields within the input buffer may be transformed into a different format, value, ordering, arrangement, and/or the like, before being placed in the output buffer. For example, certain fields in the input buffer may be encrypted before they are placed in the output buffer. In another example, certain fields in the input buffer may be removed before the contents are placed in the output buffer. In these and other cases, it may be useful to think of a build output message rule as a means of selecting at least a portion of the input buffer, possibly transforming or rearranging values, adding or subtracting values, and constructing an output that is acceptable to the receiving communication system.

In some embodiments, the build output message rule format 500 may include a source identifier 506 and/or a destination identifier 508. These may be used to identify a source field in the input buffer and/or a destination field in the output buffer. As was the case with the message filter rule format, the build output message rule format 500 may also include a size indicator 504 for the size of the block to be operated upon, as well as a next instruction indicator 512 to instruct the build output message sub-processor as to the next rule to be processed. Additionally, the rule format 500 may include a new value 510 used to transform or generate the output for the destination 508. This allows values within the rule to be combined with existing values in the input buffer, or to be added to the output buffer regardless of values in the input buffer.

FIG. 6 illustrates a bit level rule format for build output message rules, according to one embodiment. This particular embodiment as been implemented in a special-purpose trusted guard processor, and is described here merely for exemplary purposes.

In this embodiment, the "Size" field may be similar to the Size field of the message filter rule format in FIG. 4. Here, the Size field may be used to denote the size of the data block to be placed in the output buffer.

The "Type of Build" field may include a code to instruct the build output message sub-processor as to the type of operation to be performed on the output buffer. Many different types of operations may be used. For example, a move operation (0x9) may be used to move a word from the input buffer to the output buffer. This may be useful when fields should simply be passed through the trusted guard filter to the receiving communications system. Similarly, a block move operation (0x5) may be used to move a block of bits or words from the input buffer to the output buffer. This may be used to reduce the instruction size required for copying large portions of the input buffer to the output buffer. An add new field operation (0xA) may be used to add a new field to the output buffer that was not originally included in the input buffer. An add checksum operation (0xB) may be used to add a checksum value to the output buffer that is based on a checksum calculated from another portion of the output buffer. A done operation (0xE) may be used to indicate that the output buffer build process has been completed. It will be understood that the hexadecimal codes provided in parentheses have been used in one exemplary embodiment. These codes are not meant to be limiting, and any other code could be used in their place. Other possible output operation types may include encryption, media format transcoding, data compression and/or decompression, format translation, and/or the like. A particular encryption embodiment is described further hereinbelow.

The "Source Word" field may indicate a word location in the input buffer. This word location may designate the beginning of a move operation or other form of translation of input buffer data. In some embodiments, when the type or operation indicates that a new field is to be added, the word location in the output buffer may be stored in the Source Word field. Similarly, the "Destination Word" field may indicate a word location in the output buffer for the particular operation.

The "Bit Position High" fields and the "Bit Position Low" fields may be used to indicate bit positions in the word to be moved from the input buffer, as well as bit positions in the destination word of the output buffer. The "Add New Field Value" field may be used to store a new word to be added to the output buffer when a new field is being added. Alternatively, this field may be used to store a number of words to move in a block move operation. Finally, the "Pointer to Next Address" may be used to store a pointer to the next rule location to process in the filter rule table.

Figure 7:
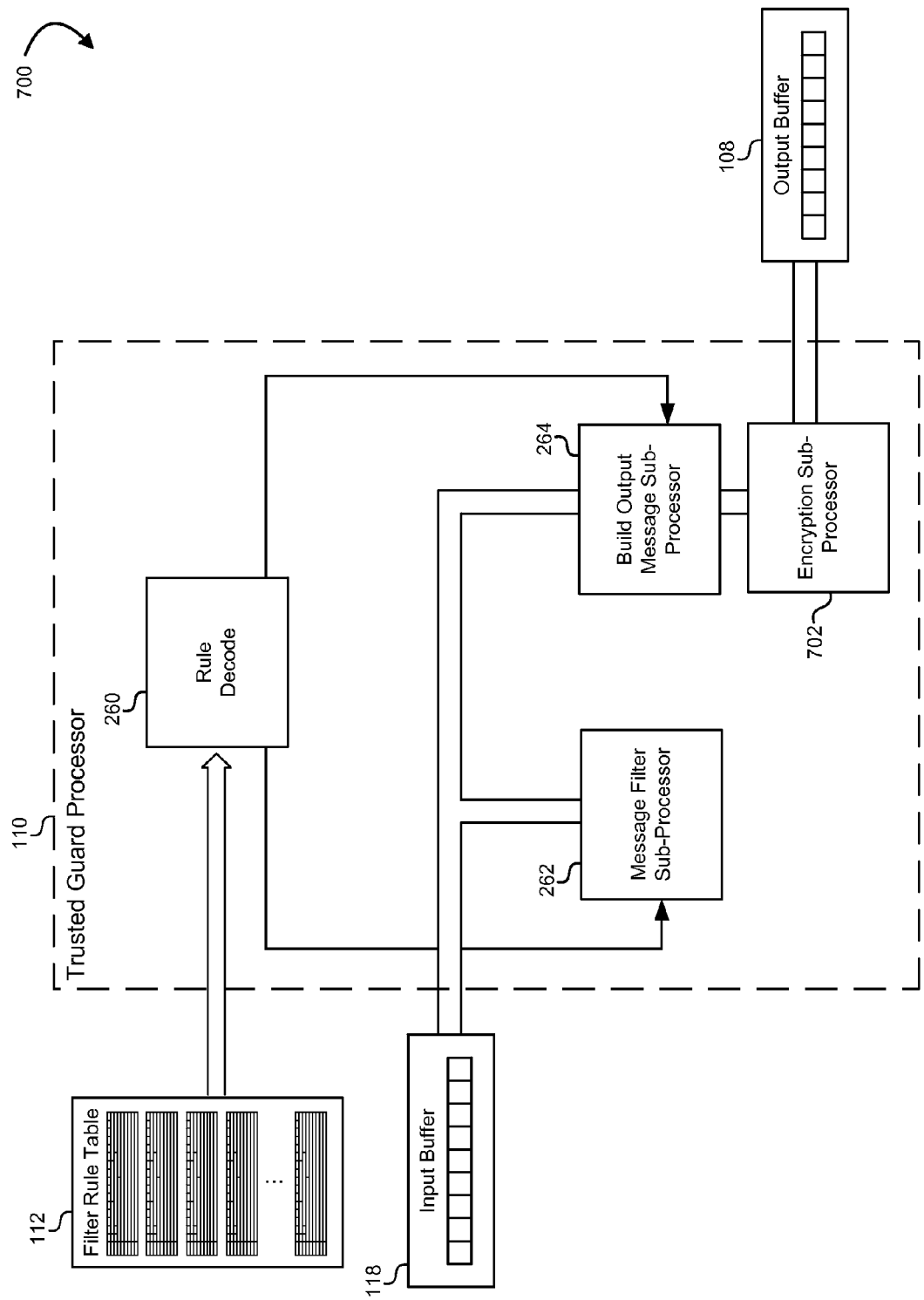
FIG. 7 illustrates a block diagram of a trusted guard processor using an encryption sub-processor, according to one embodiment.

FIG. 7 illustrates a block diagram 700 of a trusted guard processor 110 using an encryption sub-processor 702, according to one embodiment. This embodiment is similar to that of a block diagram 200a from FIG. 2A. In this embodiment, an encryption sub-processor 702 may be included to provide encryption for information being sent to the output buffer 108. The encryption sub-processor 702 is merely exemplary, and may be replaced with other types of sub-processors associated with particular operations described herein. For example, the encryption sub-processor 702 may be replaced with or supplemented by a compression/decompression sub-processor, a transcoding sub-processor, a format translation sub-processor, and/or the like.

This embodiment illustrates the encryption sub-processor 702 as a part of the trusted guard processor 110. In some embodiments, the encryption sub-processor 702 may be synthesized and implemented in the same hardware processor as the other trusted guard components, such as the message filter sub-processor 262. In other embodiments, the encryption sub-processor may be implemented as a separate hardware chip that is communicatively coupled to the trusted guard processor 110.

In a government or military setting, encryption operations may need to be designed and/or certified by the NSA. As stated earlier, approving encryption algorithms and/or hardware for operational use may require many years and great expense. Therefore, the trusted guard processor 110 may be designed to operate with different types of encryption sub-processors, such that both the trusted guard processor 110 and/or the encryption sub-processor 702 may be altered independent of the other. In cases where the encryption sub-processor 702 is implemented in the same hardware as the trusted guard processor 110, different encryption cores can be provided by encryption providers and dropped into the design layout of the trusted guard processor 110 prior to hardware synthesis. When a separate encryption chip is used, standard bus communication protocols can ensure compatibility between design upgrades.

In some embodiments, the encryption sub-processor 702 may be configured to provide many different types and/or levels of encryption. In some embodiments, a plurality of encryption sub-processors may be communicatively coupled to the build output message sub-processor 264. The type of encryption and/or the particular encryption sub-processor may be designated by a one of the build output message rules in the filter rule table 112. For example, the build output message rule may be used to choose between different modes of encryption, different initialization vectors, different key sizes, different iterations of the encryption algorithm, and/or the like.

Figure 8:
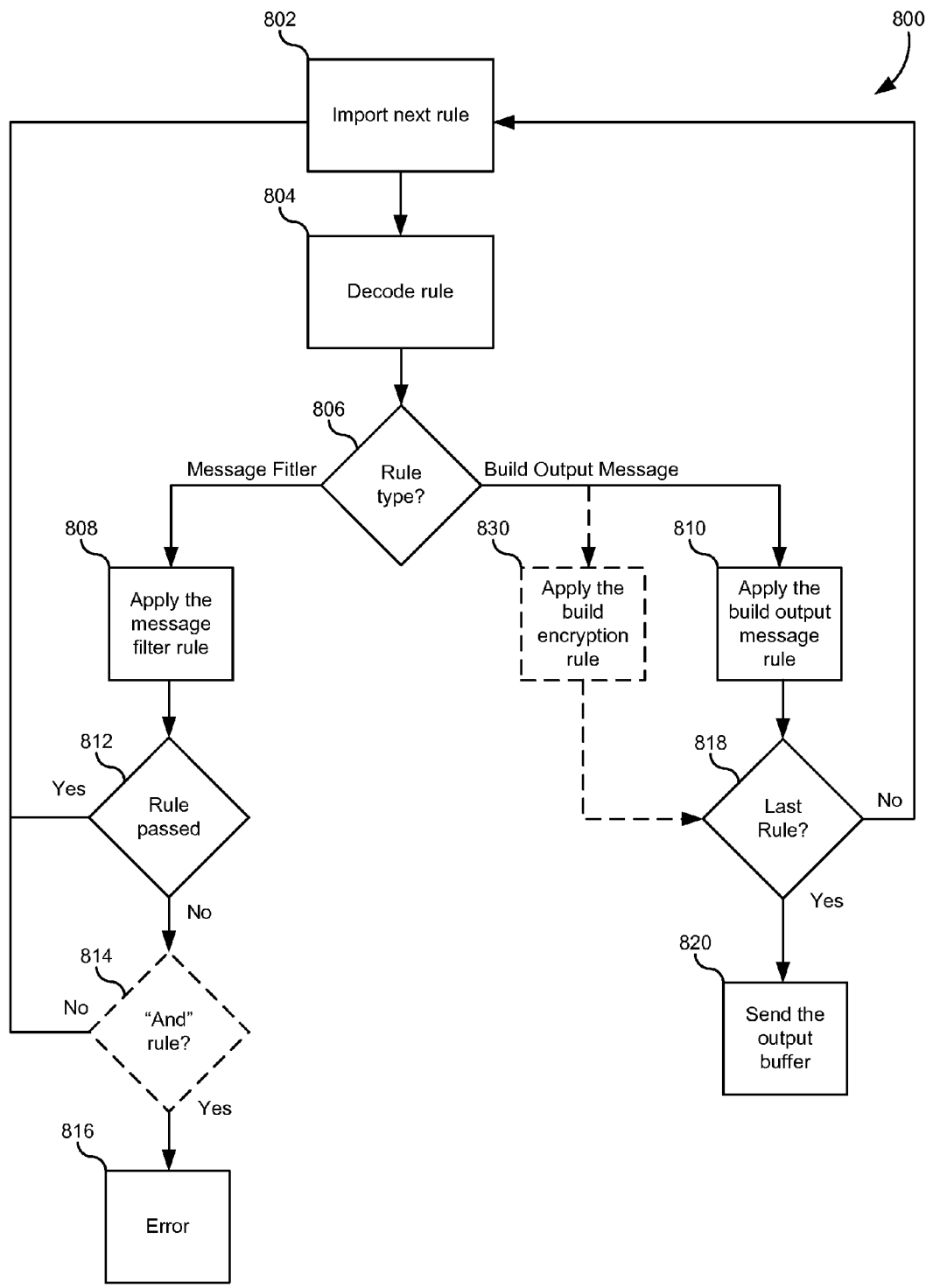
FIG. 8 illustrates a flowchart of a method for filtering messages between communication systems, according to one embodiment.

FIG. 8 illustrates a flowchart 800 of a method for filtering messages between communication systems, according to one embodiment. The method may include importing the next rule available from the filter rule table (802). When dealing with a new message in the input buffer, the next rule may comprise the first rule in the filter rule table. After processing at least one rule for the message, the next rule may be the next chronological rule in the filter rule table, or may be a next rule pointed to by a Pointer to Next Address field as described above.

The method may also include decoding the rule (804). Decoding the rule may comprise examining a type of rule code field. Using this field, a rule decode module may determine whether the rule is a message filter rule or a build output message rule (806). If it is determined that the rule comprises a message filter rule, then the rule may be sent to the message filter sub-processor for processing. If it is determined that the rule comprises a build output message rule, then the rule may be sent to the build output message sub-processor for processing.

In cases where the rule comprises a message filter rule, the message filter sub-processor may apply the message filter rule to the input buffer (808). If the contents and/or format of the input buffer are properly validated by the rule (812), then the trusted guard processor may continue by importing the next rule from the filter rule table. In some embodiments, message filter rules may be related to each other using logical expressions, such as AND or OR. If a rule is designated as an AND rule, then some embodiments may require the content/format of the input buffer to be validated by the rule in order to continue processing. If the input buffer fails to be validated by the rule, then processing this particular input buffer may end, and an error message may be generated. If a rule is designated as an OR rule, then some embodiments may allow the content/format of the input buffer to fail validation by the rule and still continue processing by importing the next rule (814).

In cases where the rule comprises a build output message rule, the build output message sub-processor may apply the build output message rule to the input buffer (810). Generally, build output message rules need not validate the contents of the input buffer, but rather translate or move information based on the contents of the input buffer to an output buffer for forwarding to a receiving communications system. Processing build output message rules may continue, one after another, until a determination is made that the last rule has been reached (818). The last rule may be designated by a field in the build output message rule, or by reaching the end of the filter rule table. When the last rule is in process, the output buffer may be sent to the receiving communications system. In some embodiments, an indication may be sent that makes the output buffer available to a communication bus.

In the special case of build output messages that specify an encryption operation, some embodiments may include a separate build output encryption pathway. In some embodiments, the build output encryption operation may use the same build output message rule format as other build output message rules. A field may be included in the build output message rule specifying the parameters for the encryption operation. In other embodiments, build output encryption operation may use a different rule format. Although it still may be classified as a build output message rule, the format of the rule may be tailored specifically to handle encryption operations using a certified encryption module. In either case, some embodiments may apply a build encryption rule (830) in a manner similar to the way in which build output message rules are applied.

It should be appreciated that the specific steps illustrated in FIG. 8 provide particular methods of filtering messages between communication systems according to various embodiments of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
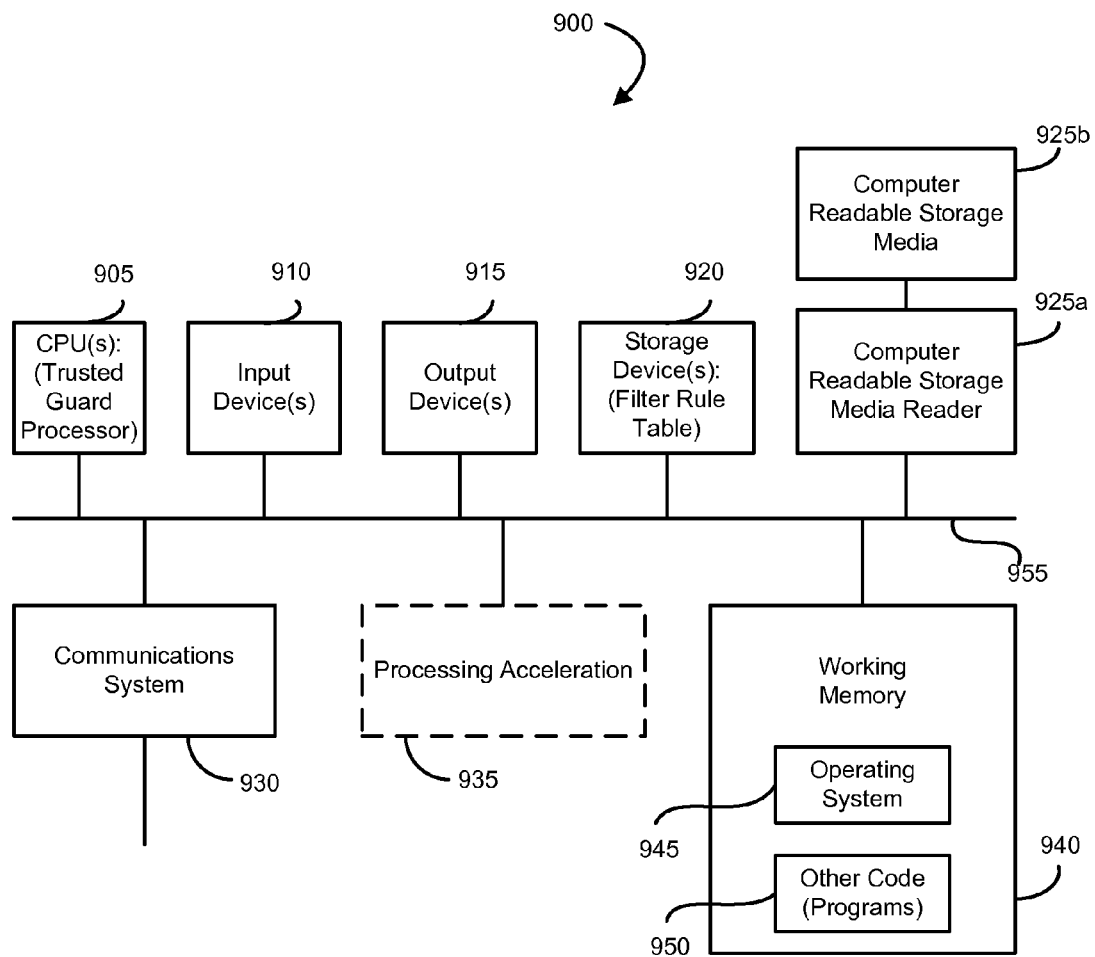
FIG. 9 illustrates a block diagram of an exemplary computer system in which embodiments of the present invention may operate.

FIG. 9 illustrates an exemplary computer system 900. The system 900 may be used to implement the trusted guard processor or trusted guard filter described above. The computer system 900 is shown comprising hardware elements that may be electrically coupled via a bus 955. The bus 925 may be similar to any of the buses illustrated in FIG. 1A. The hardware elements may include one or more central processing units (CPUs) 905, one or more input devices 910 (e.g., a mouse, a keyboard, etc.), and one or more output devices 915 (e.g., a display device, a printer, etc.). The computer system 900 may also include one or more storage device 920. By way of example, storage device(s) 920 may be disk drives, optical storage devices, solid-state storage device such as a random access memory ("RAM") and/or a read-only memory ("ROM"), which can be programmable, flash-updateable and/or the like. One or more of the CPUs may comprise the trusted guard processor 110 described earlier. One or more of the storage device(s) 920 may be used to implement the filter rule table 112, the input buffer 118, and/or the output buffer 108.

The computer system 900 may additionally include a computer-readable storage media reader 925a, a communications system 930 (e.g., a modem, a network card (wireless or wired), an infra-red communication device, etc.), and working memory 940, which may include RAM and ROM devices as described above. In some embodiments, the computer system 900 may also include a processing acceleration unit 935, which can include a DSP, a special-purpose processor and/or the like. In some embodiments, the processing acceleration unit 935 may include an encryption sub-processor, a data compression sub-processor, and/or other types of sub-processors described herein.

The computer-readable storage media reader 925a can further be connected to a computer-readable storage medium 925b, together (and, optionally, in combination with storage device(s) 920) comprehensively representing remote, local, fixed, and/or removable storage devices plus storage media for temporarily and/or more permanently containing computer-readable information. The communications system 930 may permit data to be exchanged with the network 920 and/or any other computer described above with respect to the system 900.

The computer system 900 may also comprise software elements, shown as being currently located within a working memory 940, including an operating system 945 and/or other code 950, such as an application program (which may be a client application, web browser, mid-tier application, RDBMS, etc.). This software need not run on the trusted guard processor 110 because the trusted guard processor 110 may be a special-purpose processor for operating on complex rules from the filter rule table 112. Alternatively, the software elements may be used to view, set, change, or otherwise manipulate the contents of the filter rule table 112. The software elements may also be used to view data flows, debug message filtering, generate statistical information, and/or the like.

It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed. Software of computer system 900 may include code 950 for implementing embodiments of the present invention as described herein.

Each of the methods described herein may be executed automatically by the trusted guard processor 110, and/or may be provided with inputs/outputs involving a user. For example, a user may provide inputs for each step in a method, and each of these inputs may be in response to a specific output requesting such an input, wherein the output is generated by the trusted guard processor 110. Each input may be received in response to a corresponding requesting output. Furthermore, inputs may be received from a user, from another communication system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a trusted guard processor 110, and may involve any number of inputs, outputs, and/or requests, which may or may not involve a user. Those steps not involving a user may be said to be performed by the computed without human intervention. Therefore, it will be understood in light of this disclosure, that each step and each method described herein may be altered to include an input and output to and from a user, or may be done automatically by a the trusted guard processor 110.

In the foregoing description, for the purposes of illustration, methods were described in a particular order. It should be appreciated that in alternate embodiments, the methods may be performed in a different order than that described. In addition to the special-purpose processor described, it should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs r other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A processor for filtering message traffic between a first communication system and a second communication system, the processor comprising:
    an input buffer storing an input message received from the first communication system and isolated from the second communication system;
    an output buffer that is accessible by the second communication system and isolated from the first communication system;
    a memory interface communicatively coupled to a filter rule table, wherein the filter rule table comprises:
        message filter rules for verifying input messages received by the input buffer, wherein each message filter rule comprises:
            a field for a logical operator defining a relationship with a subsequent rule; and
            a pointer to a subsequent rule; and
        build output message rules for constructing output messages based on the input messages received by the input buffer;
    a message filter state-machine circuit communicatively coupled to the input buffer, wherein the message filter circuit:
        applies the message filter rules to the input message from the input buffer; and
        determines whether the input message conforms to each of the message filter rules; and a build output message state-machine circuit communicatively coupled to the input buffer and the output buffer, wherein in response to a determination by the message filter state-machine circuit that the input message conforms to each of the message filter rules, the build output message circuit:
constructs an output message based on the input message; and
causes the output message to be stored in the output buffer.

2. The processor for filtering message traffic between a first communication system and a second communication system of claim 1 further comprising an encryption circuit that operates based on one or more of the build output message rules to encrypt at least a portion of the output message.

3. The processor for filtering message traffic between a first communication system and a second communication system of claim 2 wherein the encryption circuit is certified by the National Security Agency (NSA).

4. The processor for filtering message traffic between a first communication system and a second communication system of claim 1 wherein the message filter state-machine circuit and the build output message state-machine circuit are separate state machine circuits, neither of which is implemented using a general-purpose processor.

5. The processor for filtering message traffic between a first communication system and a second communication system of claim 1 wherein the message filter state-machine circuit and the build output message state-machine circuit are configured to process input messages at a rate of at least 10 Mb/s.

6. The processor for filtering message traffic between a first communication system and a second communication system of claim 1 wherein the build output message state-machine circuit is able to construct the output message after the message filter state-machine circuit determines that the input message conforms to each of the message filter rules.

7. The processor for filtering message traffic between a first communication system and a second communication system of claim 1 wherein the message filter rules are executed in a first batch, and the build output message rules are executed in a second batch.

8. The processor for filtering message traffic between a first communication system and a second communication system of claim 1 wherein one or more of the message filter rules includes an AND condition that instructs the message filter state-machine circuit to determine that the input message does not conform to each of the message filter rules if any of the one or more message filter rules fails.

9. The processor for filtering message traffic between a first communication system and a second communication system of claim 1 wherein one or more of the message filter rules includes an OR condition that instructs the message filter state-machine circuit to determine that the input message does not conform to each of the message filter rules if each of the one or more message filter rules fails.

10. The processor for filtering message traffic between a first communication system and a second communication system of claim 1 wherein the first communication system and the second communication system are subject to different security requirements.

11. The processor for filtering message traffic between a first communication system and a second communication system of claim 1 wherein the output message includes output values not derived from values in the input message.

12. A method of filtering message traffic between a first communication system and a second communication system using a trusted guard processor, the method comprising:
receiving an input message from an input buffer that is isolated from the second communication system, wherein the input message is sent from the first communication system;
receiving, using a memory interface communicatively coupled to a filter rule table:
message filter rules for verifying input messages received by the input buffer, wherein each message filter rule comprises:
a field for a logical operator defining a relationship with a subsequent rule; and
a pointer to a subsequent rule; and
build output message rules for constructing output messages based on the input messages received by the input buffer;
applying the message filter rules to the input message from the input buffer using a message filter state-machine circuit that is communicatively coupled to the input buffer;
determining whether the input message conforms to each of the message filter rules using the message filter state-machine circuit;
in response to determining that the input message conforms to each of the message filter rules:
constructing an output message based on the input message using a build output message state-machine circuit that is communicatively coupled to the input buffer and an output buffer that is isolated from the first communication system; and
causing the output message to be stored in the output buffer, wherein the output buffer is accessible by the second communication system.

13. The method of filtering message traffic between the first communication system and the second communication system using the trusted guard processor of claim 12 wherein the build output message state-machine circuit comprises an encryption circuit that operates based on one or more of the build output message rules to encrypt at least a portion of the output message.

14. The method of filtering message traffic between the first communication system and the second communication system using the trusted guard processor of claim 13 wherein the encryption circuit is certified by the National Security Agency (NSA).

15. The method of filtering message traffic between the first communication system and the second communication system using the trusted guard processor of claim 12 wherein the message filter state-machine circuit and the build output message state-machine circuit are separate state machine circuits, neither of which is implemented using a general-purpose processor.

16. The method of filtering message traffic between the first communication system and the second communication system using the trusted guard processor of claim 12 wherein the message filter state-machine circuit and the build output message state-machine circuit are configured to process input messages at a rate of at least 10 Mb/s.

17. The method of filtering message traffic between the first communication system and the second communication system using the trusted guard processor of claim 12 wherein the build output message state-machine circuit is able to construct the output message after the message filter state-machine circuit determines that the input message conforms to each of the message filter rules.

18. The method of filtering message traffic between the first communication system and the second communication system using the trusted guard processor of claim 12 wherein the message filter rules are executed in a first batch, and the build output message rules are executed in a second batch.

19. The method of filtering message traffic between the first communication system and the second communication system using the trusted guard processor of claim 12 wherein one or more of the message filter rules includes an AND condition that instructs the message filter state-machine circuit to determine that the input message does not conform to each of the message filter rules if any of the one or more message filter rules fails.

20. The method of filtering message traffic between the first communication system and the second communication system using the trusted guard processor of claim 12 wherein one or more of the message filter rules includes an OR condition that instructs the message filter state-machine circuit to determine that the input message does not conform to each of the message filter rules if each of the one or more message filter rules fails.

* * * * *